United States Patent [19]
Nilsson

[11] 3,876,249
[45] Apr. 8, 1975

[54] ARRANGEMENT FOR EXAMPLE IN CONNECTION WITH A SAFETY BELT

[76] Inventor: Karl Erik Nilsson, Fiskaregatan 49, S-44100 Alingsas, Sweden

[22] Filed: Jan. 16, 1973

[21] Appl. No.: 324,129

[30] Foreign Application Priority Data
Jan. 12, 1972 Sweden.................. 479/72

[52] U.S. Cl..................... 297/389; 24/77; 24/197; 24/198
[51] Int. Cl............................. A62b 35/00
[58] Field of Search.......... 24/198, 199, 77, 163 F, 24/197, 163 R, 194; 297/385, 388, 389; 280/150 SB

[56] References Cited
UNITED STATES PATENTS

| | | | |
|---|---|---|---|
| 1,976,604 | 10/1934 | Drews | 24/197 |
| 2,896,288 | 7/1959 | Davis | 24/77 R |
| 3,064,271 | 11/1962 | Kuber | 24/197 |
| 3,130,466 | 4/1964 | Carter | 24/197 X |
| 3,537,148 | 11/1970 | Carlmark | 24/194 X |

FOREIGN PATENTS OR APPLICATIONS

| | | | |
|---|---|---|---|
| 305,138 | 9/1968 | Sweden | 280/150 SB |

Primary Examiner—James T. McCall
Attorney, Agent, or Firm—Ulle C. Linton

[57] ABSTRACT

An arrangement for example in connection with a safety belt for vehicles or the like of the type with a three point suspension wherein the hip and diagonal parts of said belt in its operating condition extending in a V-shape in the cross direction of the vehicle, said diagonal belt part at one side of the seat of the vehicle being threaded and running through a deflection fitting mounted at said one side, from which it extends into a collection means, which biases the belt with a yielding force, and said hip belt part at the same time being fastened to the seat or the body of the vehicle, the belt moreover at the point of the V being threaded and running through a coupling buckle, which can be coupled to and uncoupled from a coupling device arranged at the other side of the seat of the vehicle.

3 Claims, 2 Drawing Figures

*FIG. 2*

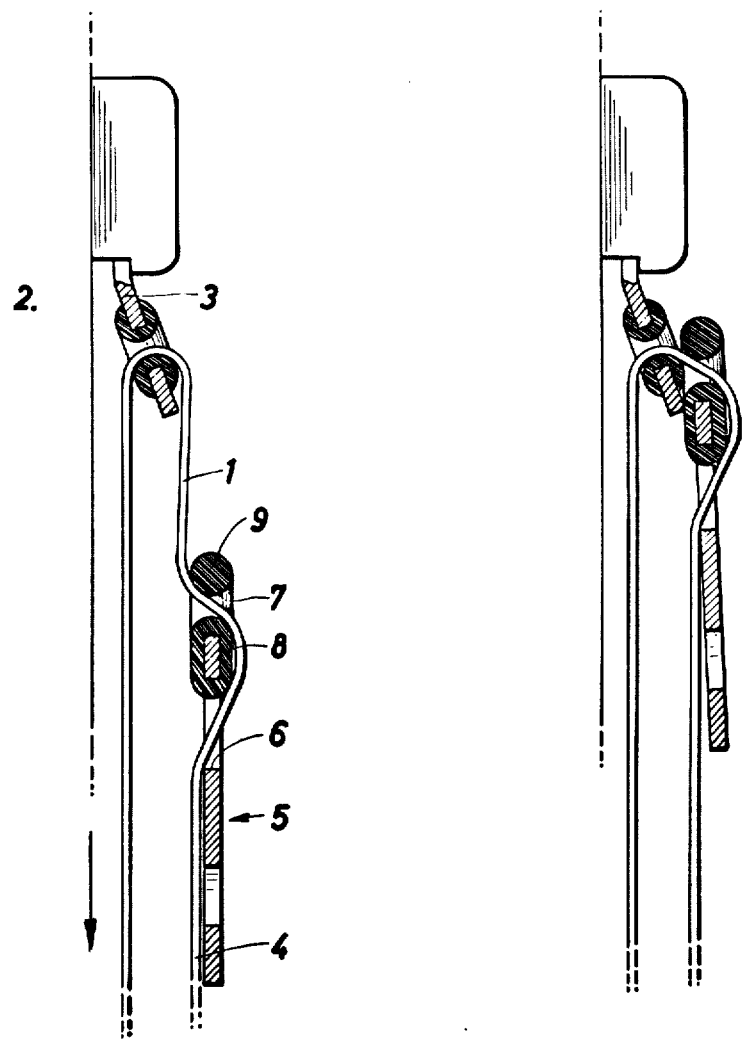

ARRANGEMENT FOR EXAMPLE IN CONNECTION WITH A SAFETY BELT

The present invention is concerned with an improvement in safety belts for vehicles.

It is a principal object of the invention to provide an arrangement of the kind mentioned in which one avoids loosely hanging belt loops, when the safety belt is not in use, without the person having used the safety belt having to take any special steps by way of example in connection with the suspension of the safety belt.

This object has been reached according to the invention by the belt being passed between two openings of the coupling buckle located at a certain distance from one another in such a manner that the portion of the belt positioned between the openings forming a bar located at the point of the V and extending in the cross direction of the belt.

An example of an embodiment of the object of the invention will now be described with reference to the accompanying drawing in which FIG. 1 is a view of a cross section through the coupling buckle and the deflection fitting in longitudinal direction relative to the belt during the passage of the safety belt to rest condition, and FIG. 2 is a view of a corresponding cross section after the non-operating condition of the belt, i.e., rest condition, has been reached.

The safety belt illustrated in the drawing is of the so called three point type, i.e., it exhibits for one part a hip belt part and for another part a diagonal belt part which in operating condition of the safety belt extend in V-shape in the cross direction of the vehicle, the diagonal belt part 1 at the wall side 2 of the vehicle being threaded and running through a deflection fitting 3 fastened to the wall of the vehicle, from which fitting it extends into a collection means not shown in the drawing. An example of such a three point type safety belt is shown in Swedish Pat. No. 305,138. This collection means can be of conventional type preferably a winding-up roll which by spring force strives to pull the belt in the direction of collection. The free end of the hip belt part 4 is fastened to the body of the vehicle or to its seat at the same side of the seat as the end part of the diagonal belt part 1 which can be collected. A coupling buckle 5 is arranged to be introduced with one end portion thereof in a coupling device arranged at the other side of the seat of the vehicle in order to be connected therewith in such a manner that uncoupling of the buckle is permitted. Said coupling device is not shown in the drawing. The coupling buckle 5 exhibits two openings 6 and 7 respectively which in between them are separated by means of a bar 8 extending in the cross direction of the belt 1, 4. The opening 6 has a comparatively long extension in the longitudinal direction of the belt, while the opening 7 is comparatively narrow and the bar 8 as well as the portion 9 exhibit a relatively great thickness compared with the rest of the portion 9 of the coupling buckle 5. The portions 8 and 9 of the coupling buckle can suitably comprise a loop which encircles the belt and which is made of plastic material and which is cast to form an integrated part with the other part of the coupling fitting. The material of the loop 8, 9 can be selected to be one of suitable friction qualities. The belt is subjected to a pulling force in the direction of the arrow shown in the drawing. When the coupling buckle 5 is uncoupled and has released its grip on the belt the diagonal and hip parts 1 and 4 respectively will be positioned substantially in line with each other, the belt forming a loop around the bar 8 as is shown in FIG. 1. The friction between the belt and the bar 8 and the portion 9 of the buckle is comparatively high on account of the strong deflection of the belt and the buckle 5 will follow in the motion of the belt until it strikes against the deflection fitting 3 whereupon a change of angle then takes place between the diagonal belt part 1 and the coupling fitting 5 as is shown in FIG. 2. Thereby the friction is considerably reduced and the belt slides relative to the coupling buckle until also the hip belt part 4 is stretched up and thus no longer exhibits any slack.

The invention is not limited to the embodiment described above and illustrated in the drawing by way of example only, but can be variated within the scope of the following claims without departing from the fundamental idea of the invention.

The invention can also be imagined to be applicable for other use than the safety belt described by way of example only, for example in connection with bands extending over a corner, a pulley pin or similar exhibiting a coupling fitting displaceable along the band which when the band is pulled over the corner will take a parking position at the same.

I claim:

1. Arrangement in connection with a safety belt of the three point type, the hip and diagonal parts of which belt in operating condition of the belt extend in a V-shape in the cross direction of the vehicle, said diagonal belt part at one side of the seat of the vehicle being threaded and running through a deflection fitting mounted at said one side, from which it extends into a collection means, which biases the belt with a yielding force, and said hip belt part at the said side being fastened to the seat or the body of the vehicle, means for preventing loosely hanging belt loops comprising a coupling buckle having a first and second opening, said belt at the point of the V being threaded and running through said first and said second openings in said coupling buckle, the portion of said buckle positioned between said openings forming a bar located at the point of the V of said belt and extending in the cross direction of said belt, wherein said buckle is adapted to be coupled to and uncoupled from a corresponding coupling device located at the other side of the seat, said first buckle opening, which is located nearest to the deflection fitting, having a small extension and the second buckle opening having a large extension in the longitudinal direction of the belt, whereby the belt extends through the range of said first opening with a large deflection degree when said coupling buckle has a position at some distance from said deflection fitting and the belt arrangement is in its unactive condition while said belt extends through the range of said second buckle opening with a small deflection degree in last mentioned condition of the belt, wherein the belt when by said yielding force its diagonal belt part is drawn through said deflection fitting, will receive a decrease of the deflection degree in the range of said first buckle opening when said coupling buckle contacts the deflection fitting, whereby the friction action between said coupling buckle and the belt portion thread therethrough will come below the yielding force produced by said collection means.

2. Arrangement as claimed in claim 1 wherein the portions of said coupling buckle adjoining said first opening have a large extension in the thickness direction of said coupling buckle and consequently also in the thickness direction of the belt.

3. Arrangement as claimed in claim 1, wherein the portions of said coupling buckle adjoining said first buckle opening having a high coefficient of friction.

* * * * *